J. H. Barringer.
Cultivator & Sulky Plow.
N° 61,039. Patented Jan. 8, 1867.
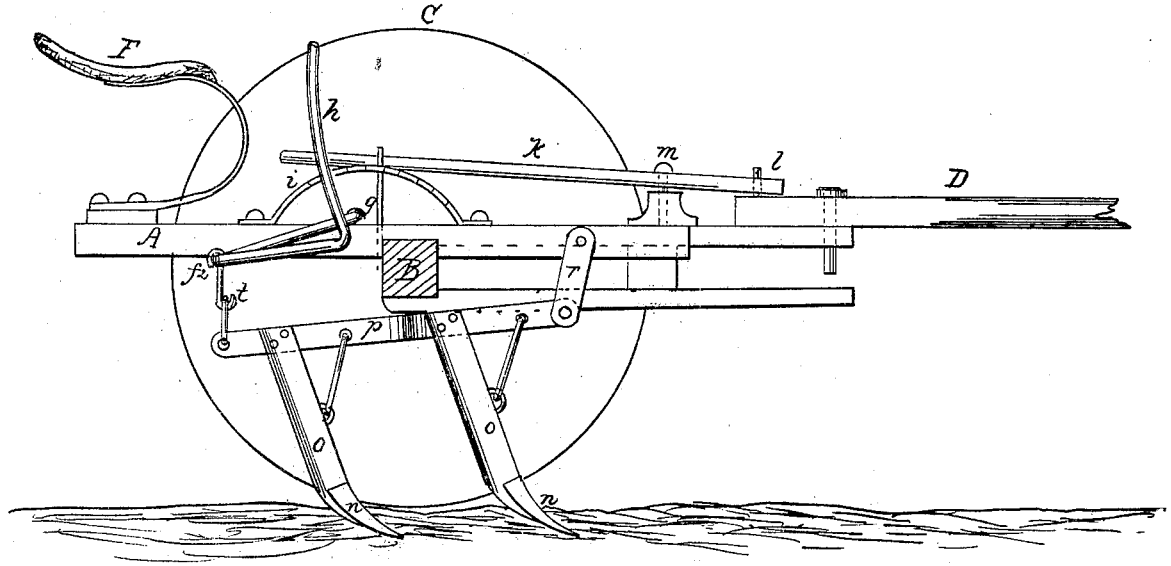
Witnesses:
Theo Tusch
J. A. Servie
Inventor:
J. H. Barringer
Per Munn &
Attorneys

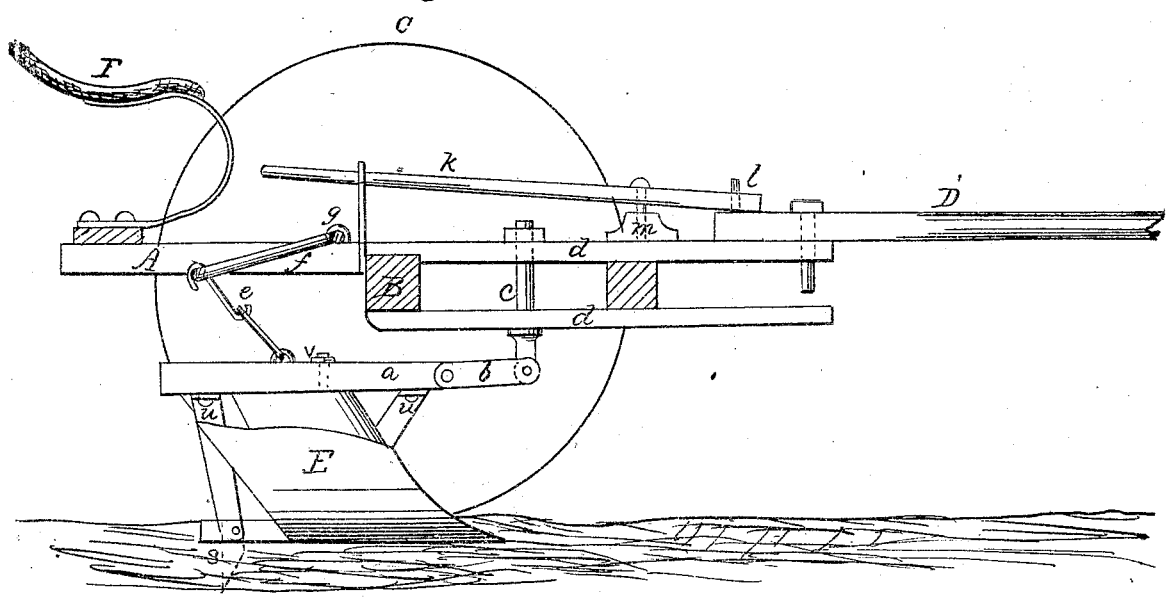

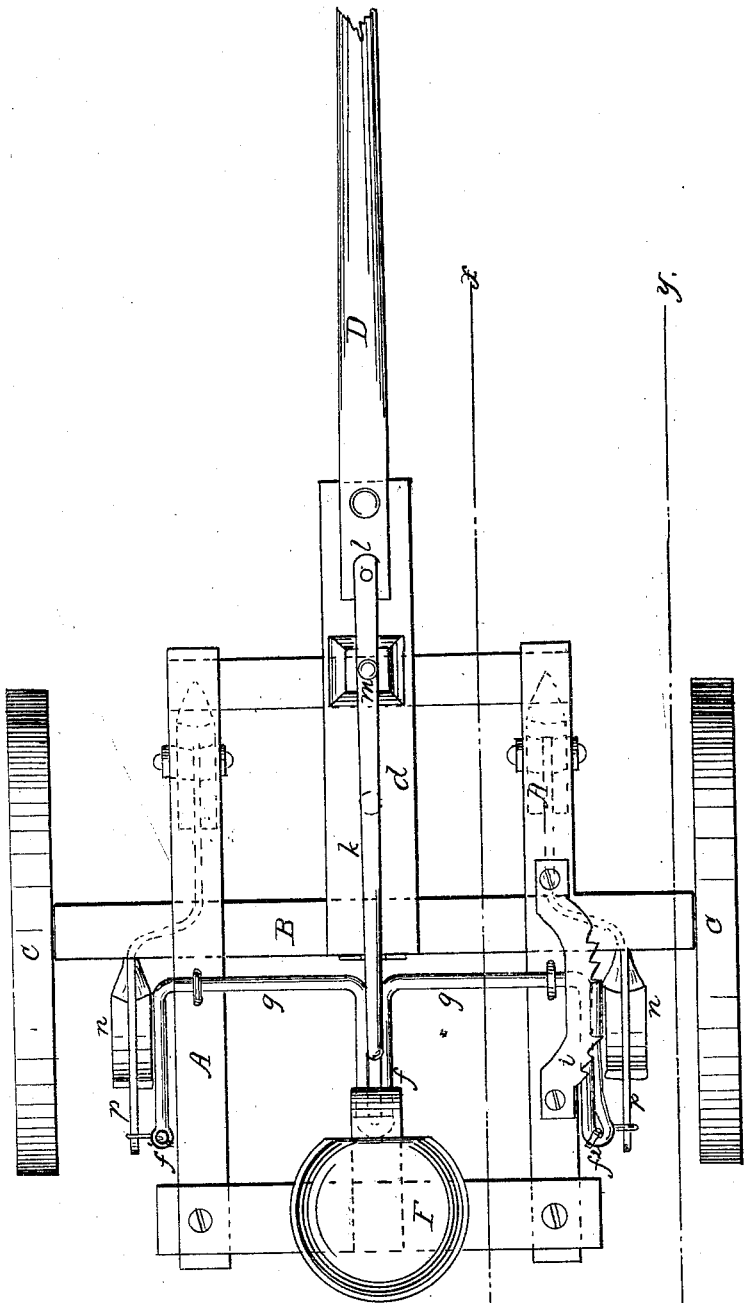

United States Patent Office.

JOHN H. BARRINGER, OF HILLSBORO', ILLINOIS.

Letters Patent No. 61,039, dated January 8, 1867.

---

IMPROVEMENT IN CULTIVATOR AND SULKY-PLOUGH.

---

*The Schedule referred to in these Letters Patent and making part of the same.*

---

TO ALL WHOM IT MAY CONCERN:

Be it known that I, JOHN H. BARRINGER, of Hillsboro', in the county of Montgomery, and State of Illinois, have invented a new and improved Cultivator and Sulky-Plough; and I do hereby declare that the following is a full, clear, and exact description thereof, which will enable others skilled in the art to make and use the same, reference being had to the accompanying drawings, forming a part of this specification, in which—

Figure 1 is a side sectional view of my invention when arranged as a plough, taken in the line $x\ x$, fig. 3.

Figure 2 is a similar view when arranged as a cultivator, taken in the line $y\ y$, fig. 3.

Figure 3 is a top view of the machine.

Similar letters of reference indicate like parts.

This invention relates to a combined cultivator and sulky-plough, and consists in an arrangement of the parts in such manner that they can be readily shifted for converting the machine into either a cultivator or a plough, so that the body and running-gear of one implement shall serve for both purposes, and thus save the farmer the cost of two machines.

A represents a rectangular frame mounted on the axle B, of two driving-wheels, C C and D, the draught-pole pivoted at the rear end to work sidewise upon the end of a projecting timber, $d$. E represents a plough hung on a short beam, $a$, by a pivot-bolt, $v$, in the middle, and connected front and rear by adjustable plates, $u\ u$, under the beam, for the purpose of setting so as to give the plough more or less land, as required. The fore end of the plough-beam, $a$, is pivoted to a slotted bar or clevis, $b$, to work vertically, which clevis is also pivoted at the other end to a supporting-rod, $c$, which passes up through middle frame timbers, $d\ d$, and is secured at the upper end to them by a screw-nut, or in any suitable manner. The rear end of the plough-beam $a$ is suspended by a hook, $e$, to an arm, $f$, projecting down from a vibrating bar, $g$, which is pivoted transversely to the frame A, and is operated for lowering or elevating, as required, by a hand-lever, $h$, fig. 2, which is placed near the right of the driver's seat, F, for convenience in managing. The lever $h$ works by the side of a segmental bar or guide, $i$, in which are notches to catch the lever and hold it in place when the plough is raised or lowered. On the heel of the plough is attached a short pointed coulter or stop-wedge, $s$, which is turned down when a land is finished, to keep the plough firmly in place. A guide-rod or lever, $k$, is pivoted at $l$ to the rear end of the draught-pole D, having its fulcrum at $m$, and running back nearly to the seat of the driver, so that he may work the tongue D sidewise, and guide the machine without turning the horses. The machine is thus arranged for use as a sulky-plough, and is converted readily into a cultivator by detaching the plough-beam from the frame and connecting the double sets of cultivators which are hung on both sides, as shown in figs. 2 and 3. Two cultivator-shovels, $n\ n$, are fitted as usual to the lower ends of the standards $o\ o$, which are fastened at their upper ends, one behind the other, upon an iron bar or beam, $p$, which is bent sidewise between the standards $o\ o$, so as to throw the cultivators, $n\ n$, out of line with each other as much as may be desired. Iron beams and cultivators thus constructed are hung on each side of the frame A by means of vertical working connections or clevises, $r$, on their fore ends, and by hooks, $t\ t$, on their rear ends, to projections, $f^1\ f^2$, on the vibrating bar $g$, in the same manner as the plough-beam $a$, previously described, to be operated also in the same way by the lever $h$. Thus it will be seen that the machine is now converted into a cultivator, and that by shifting the parts it may be readily changed again into a sulky-plough as before, making a combined plough and cultivator which is easily adjusted to serve for either purpose.

Having described my invention, what I claim as new, and desire to secure by Letters Patent, is—

1. I claim the arrangements herein described of a combined cultivator and sulky-plough, connected and operating separately when the parts are shifted, substantially as herein described.

2. I claim the arrangement of a shifting plough E, connected with the beam $a$ by the adjustable plates $u\ u$, and suspended in the front by the joint $b$, and the bar $c$, and in the rear by the hook $e$, to the arm $f$, on the vibrating bar $g$, substantially as and for the purposes herein described.

3. I claim, also, the arrangement of the shifting cultivators $n\ n$, attached out of line with each other to the bent iron beams $p$, and suspended in front by the jointed connections $r$, and behind by the hooks $t$, to the arms $f^1\ f^2$, on the vibrating bar $g$, substantially as and for the purposes herein described.

4. I claim, also, the arrangement of a guide-rod or lever $k$, connected with the draught-pole D, substantially as and for the purpose herein specified.

The above specification of my invention signed by me this 14th day of September, 1866.

JOHN H. BARRINGER.

Witnesses:
WM. D. SHIRLEY,
AMOS MILLER.